(12) United States Patent
Shibuya (10) Patent No.: US 7,650,012 B2
(45) Date of Patent: Jan. 19, 2010

(54) MOVING-OBJECT HEIGHT DETERMINING APPARATUS BY IMAGE PROCESSING OF TWO-DIMENSIONAL IMAGE

(75) Inventor: Satoru Shibuya, Kyoto (JP)

(73) Assignee: Giken Trastem Co., Ltd., Kyoto-Shi, Kyoto-Fu (JP)

( * ) Notice: Subject to any disclaimer, the term of this patent is extended or adjusted under 35 U.S.C. 154(b) by 692 days.

(21) Appl. No.: 11/211,603

(22) Filed: Aug. 26, 2005

(65) Prior Publication Data

US 2006/0045311 A1   Mar. 2, 2006

(30) Foreign Application Priority Data

Sep. 2, 2004   (JP) .............................. 2004-255562

(51) Int. Cl.
*G06K 9/00* (2006.01)
(52) U.S. Cl. ..................................... 382/103
(58) Field of Classification Search ......... 382/103–107; 348/113, 154, 155, 169–179; 356/3–10, 356/27–40; 340/907–917, 933–940
See application file for complete search history.

(56) References Cited

U.S. PATENT DOCUMENTS 6,535,114 B1 * 3/2003 Suzuki et al. ............... 340/435
6,542,621 B1 * 4/2003 Brill et al. .................. 382/103

FOREIGN PATENT DOCUMENTS

| JP | 6-309461 A | 11/1994 |
|----|------------|---------|
| JP | 8-123963 A | 5/1996 |
| JP | 10-334207 A | 12/1998 |
| JP | 2002-032767 A | 1/2002 |
| JP | 2002-150304 A | 5/2002 |

OTHER PUBLICATIONS

Lena Klasén et al., "Using videogrammetry and 3-D image reconstruction to identify crime suspects," Spie, vol. 2942, pp. 162-168 (1997), XP-002393104.

* cited by examiner

*Primary Examiner*—Samir A. Ahmed
*Assistant Examiner*—Atiba O Fitzpatrick
(74) *Attorney, Agent, or Firm*—Fitch, Even, Tabin & Flannery; Kendrew H. Colton (57) ABSTRACT

The present invention relates to a moving-object height-determining apparatus which tracks and monitors a moving-object, such as a human, from a two-dimensional image captured from above by single image-capturing means to calculate a relative height of two moving objects existing relatively close to each other.

3 Claims, 7 Drawing Sheets

MOVING-OBJECT HEIGHT DETERMINING APPARATUS BY IMAGE PROCESSING OF TWO-DIMENSIONAL IMAGE

This U.S. Utility Patent Application claims priority from Japanese Application No. JP 2004-255562, filed Sep. 2, 2004, the complete disclosure of which is incorporated herein by reference.

BACKGROUND OF THE INVENTION

1. Field of the Invention

The present invention relates to a moving-object height determining apparatus which tracks and monitors a moving-object such as a human from a two-dimensional image captured from above by single image-capturing means to calculate a relative height of two moving-objects existing relatively close to each other.

2. Disclosure of the Prior Art

Conventionally, there is a technique for identifying a moving-object from a two-dimensional image. In this technique, a moving-object is extracted utilizing a concentration difference between the moving-object and a background with respect to a two-dimensional image in a monitor region captured by a video camera. As a technique for determining whether the extracted moving-object is a target moving-object to be monitored, if a subject to be monitored is a human, an object image of the extracted moving-object is directly or indirectly verified against a standard object image which is imitated from an outer shape of the human.

In order to precisely measure a human at the busy hour, there is a known stereo image measuring technique in which images of the same monitoring region are captured by two cameras to obtain a stereo image, a distance between a subject to be monitored and humans is measured based on a principle of triangulation from the stereo image, the humans are separated from each other, and the respective positions of the humans are recognized.

In the moving-object identifying technique, when the moving-object is to be extracted, not only the target moving-object which is the subject to be monitored, but also accessories of the moving-object are also extracted as the subject to be monitored in some cases. For example, if the subject to be monitored is a human, a shadow of the human, a large bag carried by the human, a hand truck moved by the human and the like could be extracted as the moving-object of the subject to be monitored. This is because that if the sensitivity of verification is made strict, there is an adverse possibility that a moving-object of a subject to be monitored can not be found, it is necessary to relax the verification sensitivity to some extent.

In this case, in the real space coordinate system, since all of a shadow of a human, a large bag carried by the human, a hand truck moved by the human and the like which are not the subject to be monitored are lower in height than the human who is the subject to be monitored, it is considered to determine the height of the moving-object extracted by the stereo image measuring technique to eliminate information which is not the subject to be monitored.

According to the stereo image measuring technique, however, the quantity of image data to be processed is increased. Therefore, the image processing speed becomes slow, a large capacity memory is required, and at least two cameras must be prepared as the image-capturing means. As a result, there arises a problem that the apparatus is increased in size and cost.

SUMMARY OF THE INVENTION

It is an object of the present invention to realize a moving-object height determining apparatus capable of easily and favorably determining the height of a moving-object by tracking and monitoring the moving-object using single image-capturing means.

In order to achieve the aforementioned object, the present invention provides a moving-object height determining apparatus comprising:

single image-capturing means for capturing an image of a monitoring region from above;

recognition means for recognizing, as a moving-object, a region having a concentration difference of an image in a two-dimensional image obtained from the image-capturing means to calculate a representative point;

tracking means for tracking the representative point; and height calculation means having a conversion coefficient which converts, into a real space distance, a distance in an image determined by assuming a point in the image as a height from the ground, wherein, when two representative points to be calculated by the recognition means are adjacent to each other in the image:

the height calculation means obtains two loci in the image obtained by tracking the two representative points independently during a period of a plurality of clocks by the tracking means, the height calculation means regards one representative point as a standard point having a standard height from the ground and regards the other representative point as an assumption point having a height set value of a virtual height from a ground and determines a comparative point corresponding to the virtual height on a vertical axis passing through the standard point on the real space, the height calculation means obtains a distance between two points of the comparative point and the assumption point on the real space using the conversion coefficient and obtains a distance between the two points of the comparative point and the assumption point on the real space after tracking the two representative points during the period of the plurality of clocks to obtain a fluctuation amount of the distance between the two points of the comparative point and the assumption point and a real space moving distance of the standard point during the period of the plurality of clocks, the height calculation means assumes at least three different height set values of a virtual height from the ground with respect to the assumption point, and obtains the fluctuation amount of the distance between the two points of the comparative point and the assumption point for every different height set value, the height calculation means obtains a fluctuation amount of the distance between the two points of the comparative point and the assumption point and a real space moving distance of the standard point during the period of the plurality of clocks in a state where a relation of the standard point and the assumption point is reversed from each other with respect to each of the height set values, and when the height calculation means determines the smallest fluctuation amount of the fluctuation amounts in the different height set values and determines that a ratio of the smallest fluctuation amount with respect to the real space moving distance of the standard point falls within a constant value, the height calculation means obtains the virtual height of the height set value indicating the smallest fluctuation amount as a height of the moving-object in the assumption point with respect to a height of the moving-object in the standard point, or the height calculation means regards that the fluctuation amounts in the different height set values vary in a form of two-dimensional equation, and obtains a correction value of the virtual height indicating a minimum value In the two-dimensional equation as a height of the moving-object in the assumption point with respect to a height of the moving-object in the standard point.

Effects

Figure 3:
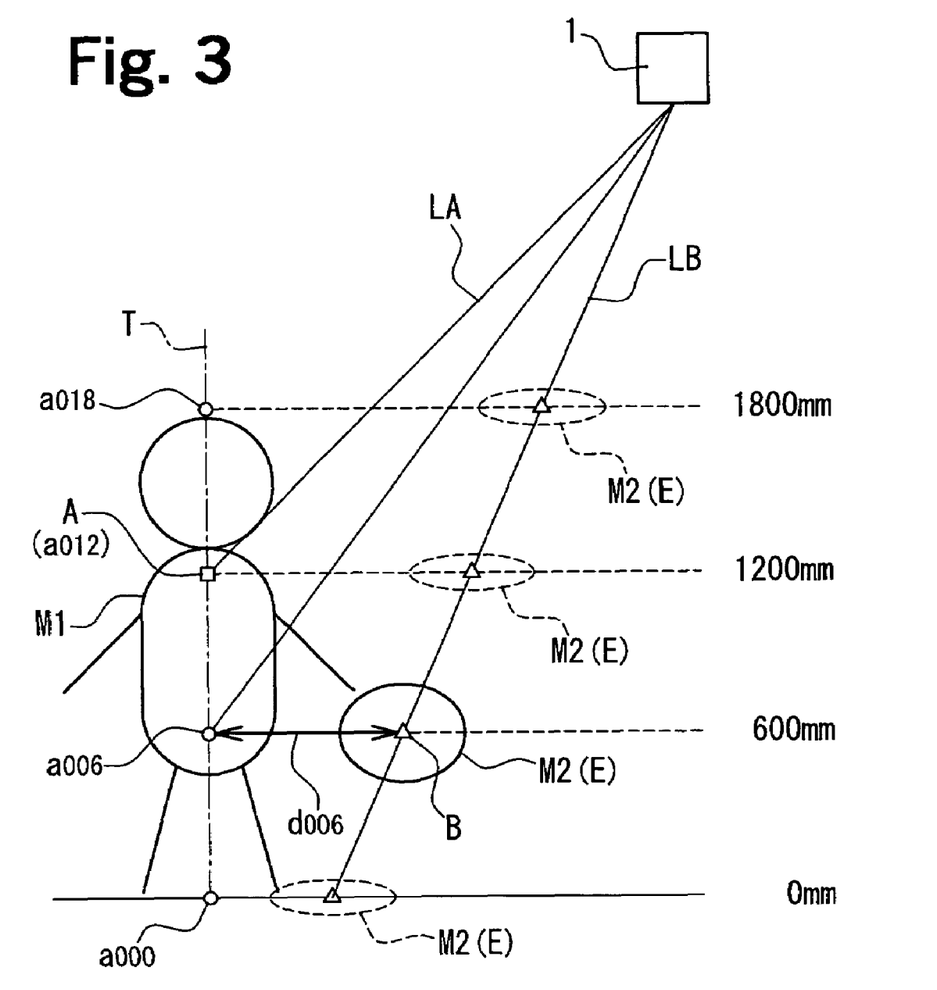
FIG. 3 is a schematic diagram for three dimensionally explaining the processing by a height calculation unit 24 in the first embodiment.

In a two-dimensional image captured from above by single image-capturing means such as one camera or the like disposed above, all of points on a line LA in FIG. 3 are seen as a single point in an image space. Therefore, a real space distance between a point on the line LA and a point on a line LB can not be measured on the image. Herein, if a height from the ground is assumed with respect to the lines LA and LB, a position in the real space is specified, and it becomes possible to measure a distance in the real space by a conversion coefficient calculated from a lens constant of the camera, angle information and position information in the image.

For example, when two moving-objects exist relatively close to each other, if the two moving-objects are a couple, although relative position and relative distance of the two persons are varied on the image as they move (because a subject appears largely in the vicinity of the camera, and the subject appears smaller as the subject goes away from the camera), a positional relation at the real space distance is not varied almost at all. Further, a positional relation between one of the person and a bag carried by the person, or between the person and his/her shadow on the real space is not varied almost at all. If a height in which a relative positional relation on the real space is not varied can be assumed, it can be said that the assumption height is correct. No matter what height is assumed, if the variation of the relative positional relation is great in the real space, since the two points are moving independently, these two points can not be regarded as a single body, and this information can not be used for determining the height of this object naturally.

When a subject to be detected is a vehicle, since the height of a vehicle is different depending upon vehicle type, a tire thereof is defined as a standard height point, the standard height is defined as 0 mm in height from the ground, the other assumption point is assumed to measure the height of a roof or front glass of the vehicle, a relative height between relatively close two points is measured, and only an object having a relative height between at least two points of about 600 mm or more in height is set to a subject to be detected. With this, it becomes possible to eliminate influence of variation in road surface and shadow on the road surface. When the road surface is varied, since the variations of the two points are independent from each other, no matter what height is assumed, the variation in the relative positional relation in the real space is great, and this can not be regarded as a single object.

Since the shadow can be detected assuming the relative height between the two points is about 0 mm, the influence thereof can be eliminated.

Thus, when a point to be calculated by the recognition means exists two relatively close to each other in the same image, one of the points is regarded as a standard point having the standard height from the ground, and it is assumed that this standard point represents a specific moving-object to be monitored. The other point is regarded as an assumption point having a virtual height from the ground, and it is assumed that this assumption point is a specific moving-object which is not to be monitored. The virtual height of the assumption point is set to a certain height set value of the moving-object representing the assumption point of about 0 to 1800 mm.

Then, a comparative point which is corrected to the virtual height from the ground is obtained on the vertical axis on the real space passing through the standard point. With this, if the height set value corresponds to the height of the moving-object representing the assumption point, the comparative point has substantially the same height as that of the assumption point.

Next, a distance between the two points, i.e., the comparative point and the assumption point on the real space is obtained using the conversion coefficient, and a distance between the two points on the real space is obtained with respect to the result of tracking during the period of a plurality of clocks. A fluctuation amount of the distance between the two points and a moving distance in the real space during the period of the plurality of clocks of the standard point are obtained. At least three or more kinds of height set values of the virtual height from the ground in the assumption point are assumed, and the fluctuation amount of the distance between the two points is obtained for each different height set value.

The standard point and the assumption point are reversed as a relation of the two points and, in this state, the fluctuation amount of the distance between the two points and a moving distance in the real space during the period of the plurality of clocks of the standard point are obtained. This is because that the relation between the initially set standard point and assumption point may be opposite in some actual cases.

Then, when the fluctuation amount of these fluctuation amounts is the smallest and a ratio of the standard point to the moving amount falls within a constant value, the assumption height by the height set value is obtained as a relative height of the moving-object in the assumption point with respect to the moving-object in the standard point, or it is considered that the fluctuation amount is varied in a form of two dimensional equation for each of the assumption height, and a correction value of the assumption height taking an extremely small value is obtained as a relative height of the moving-object in the assumption point with respect to the moving-object in the standard point.

The present invention has the aforementioned structure and, therefore, has the following specific effects.

As explained above, according to the present invention, it is possible to easily and favorably determine the height relation on a real space with respect to two moving-objects existing relatively close to each other in the same two-dimensional image captured by single image-capturing means from above.

As a result, it is possible to discriminate a moving-object which is not an original subject to be monitored from moving-objects once tracked as subjects to be monitored by the recognition means, and it is possible to realize a moving-object identifying apparatus having excellent monitoring precision.

The present invention also provides a moving-object height determining apparatus comprising:

single image-capturing means for capturing an image of a monitoring region from above;

recognition means for recognizing, as a moving-object, a region having a concentration difference of an image in a two-dimensional image obtained from the image-capturing means to calculate a representative point;

tracking means for tracking the representative point; and height calculation means having a conversion coefficient which converts, into a real space distance, a distance in an image determined by assuming a point in the image as a height from the ground, wherein when a point to be calculated by the recognition means exists two relatively closely to each other in the same image, the height calculation means obtains a locus in an image obtained by tracking the two points independently during a period of a plurality of clocks by the tracking means, the height calculation means regards one of the points as a standard point having a standard height from the ground and regards the other point as an assumption point having a virtual height from a ground to obtain a comparative point corrected to the standard height from the ground on a vertical axis on a real space passing through the assumption point, the height calculation means obtains a distance between two points, i.e., the comparative point and the assumption point on the real space using the conversion coefficient and, also, obtains a distance between the two points on the real space with respect to a result of tracking during the period of the plurality of clocks to obtain a fluctuation amount of the distance between the two points and a real space moving distance during the period of the plurality of clocks of the standard point, the height calculation means assumes at least three or more kinds of height set values of a virtual height from the ground in the assumption point, and obtains the fluctuation amount of the distance between the two points for every different height set value, the height calculation means obtains a fluctuation amount of the distance between the two points and a real space moving distance during the period of the plurality of clocks of the standard point in the same manner as that described above in a state where the standard point and the assumption point are reversed from each other as a relation of the two points, and when the fluctuation amount of these fluctuation amounts is the smallest and a ratio of the standard point to the moving amount falls within a constant value, the assumption height by the height set value is obtained as a relative height of the moving-object in the assumption point with respect to the moving-object in the standard point, or it is considered that the fluctuation amount is varied in a form of two dimensional equation for each of the assumption height, and a correction value of the assumption height taking an extremely small value is obtained as a relative height of the moving-object in the assumption point with respect to the moving-object in the standard point.

This moving-object height determining apparatus corrects the assumption point to obtain the comparative point, and exhibits the same effects as those of the aforementioned moving-object height determining apparatus.

These and other object, features, aspects and advantages of the invention will become more apparent from the following detailed description of embodiments with reference to the accompanying drawings.

DETAILED DESCRIPTION OF THE EMBODIMENTS

Embodiments of the present invention will be explained with reference to the drawings.

In the following embodiments, description will be given of a moving-object identifying apparatus to which a moving-object height determining apparatus according to the present invention is applied.

The moving-object identifying apparatus in each of the embodiments tracks and monitors a moving-object such as a human from a two-dimensional image of a monitoring region captured from above by single image-capturing means, and calculates the height with respect to a moving-object which moves side by side, thereby determining whether the moving-object is a subject to be monitored. In the following embodiments, the subject to be monitored is a human.

First Embodiment

Figure 1:
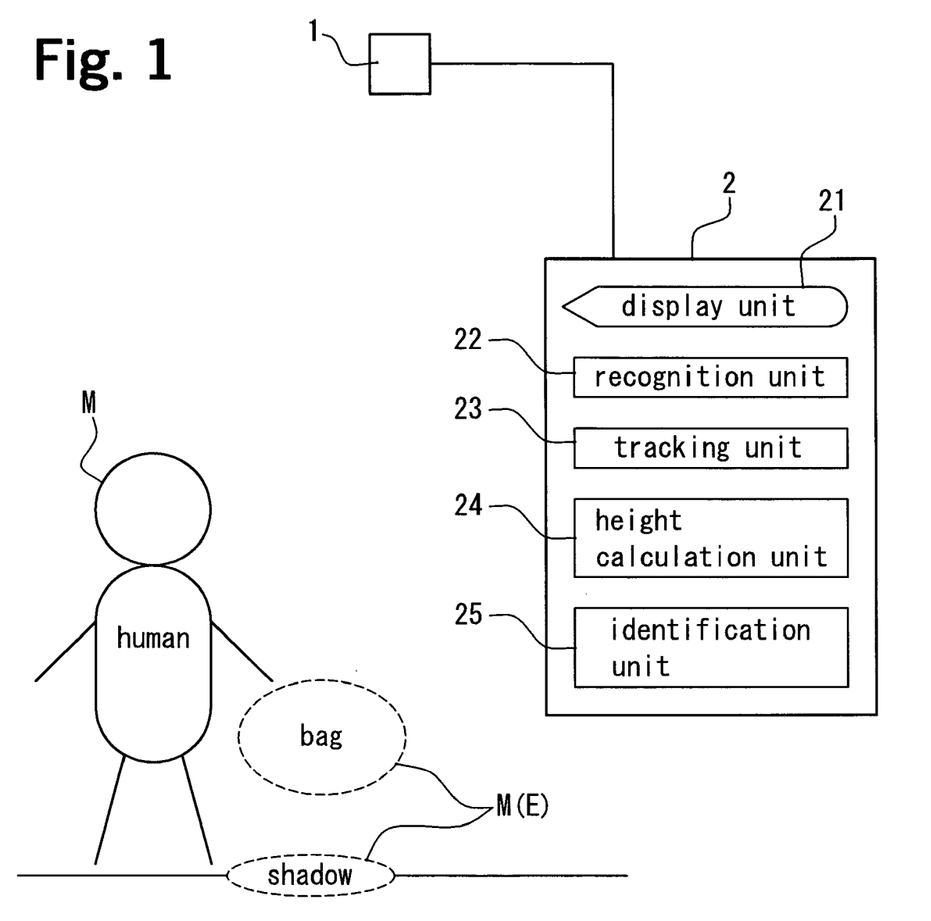
FIG. 1 is a schematic diagram showing a structure of a moving-object identifying apparatus according to a first embodiment.

As shown in FIG. 1, a moving-object identifying apparatus according to a first embodiment includes one camera 1 which receives an image of a monitoring region captured from above, and a main body 2 which image-processes image data from the camera 1.

The camera 1 inputs, to the main body 2, image data of a two-dimensional image of a space of the monitoring region as viewed from above. The image data from the camera 1 is a moving image captured with time on a constant clock basis.

The main body 2 takes a form of, for example, a personal computer. The main body 2 includes a display unit 21 which displays a two-dimensional image G captured by the camera 1 on a screen, a recognition unit 22 which recognizes, as a moving-object, a region having concentration difference of an image in the two-dimensional image obtained from the camera 1 to calculate a representative point, a tracking unit 23 which tracks the representative point, a height calculation unit 24 which has a conversion coefficient for converting, into a real space distance, a distance in an image determined by assuming a point in the image as a height from the ground, and an identification unit 25 which determines whether the moving-object of relative height obtained by the height calculation unit 24 is the subject to be monitored.

The identification unit 25 determines whether two moving-objects M existing relatively close to each other tracked by the recognition unit 22 is one person and a shadow, a bag, a hand truck and the like of the person, or two persons, based on the relative height calculated by the height calculation unit 24. As a result, if the moving-object is not a human of the subject to be monitored, the identification unit 25 eliminates this information or newly monitors the same. The display unit 21 has a merit in that an observer can directly check the image, but the display unit 21 is not absolutely necessary in the present invention. The recognition unit 22, the tracking unit 23, the height calculation unit 24 and the identification unit 25 can be realized by a computer program, an electronic circuit and the like.

The operation of the moving-object identifying apparatus will be explained next.

Figure 2:
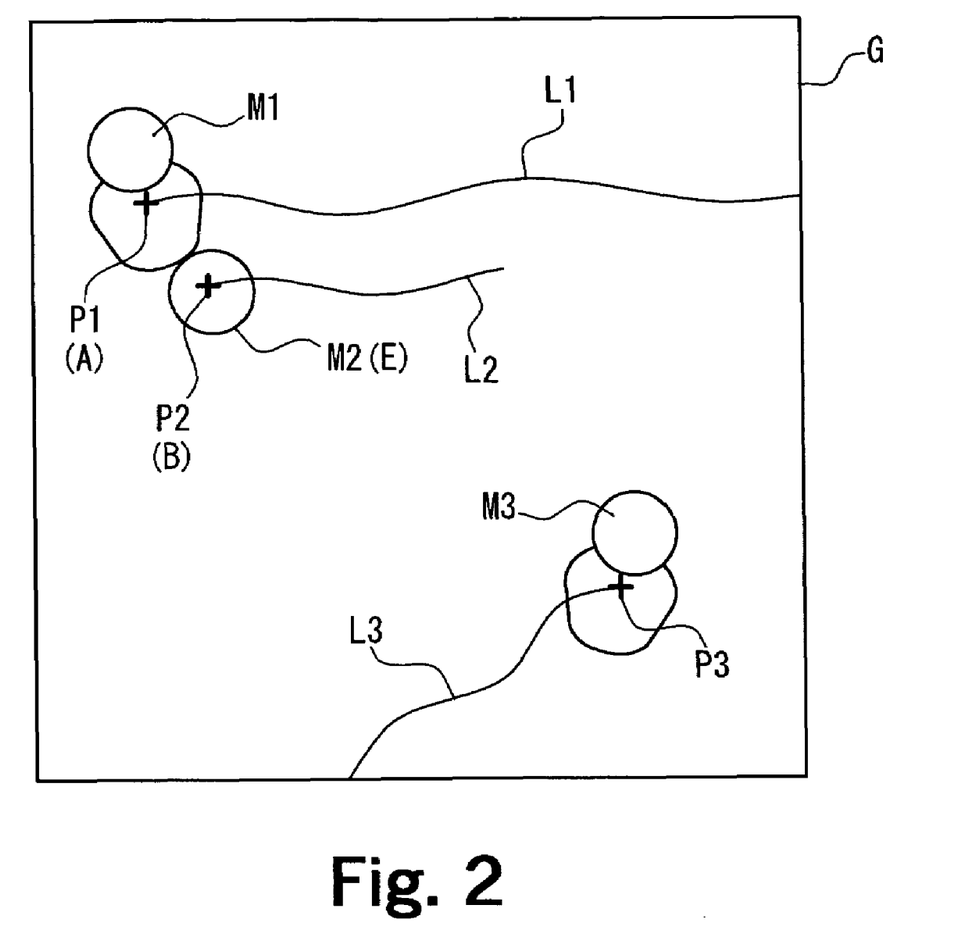
FIG. 2 is a schematic diagram showing a two-dimensional image of a monitoring region captured from above by one camera (single image-capturing means)

As shown in FIG. 2, when the camera 1 captures an image of a moving-object M which is regarded as a human of the subject to be monitored in a two-dimensional image G of a monitoring region captured by the camera 1 from above, the recognition unit 22 displays this moving-object M with a representative point P having a constant standard height in the space. Then, the tracking unit 23 outputs a tracking line L by the representative point P, and tracks and monitors the same. A vector focus method disclosed in, for example, Japanese Patent No. 3406587 is utilized for the image recognition operation of the identification unit 25.

According to this method, a moving-object M is identified utilizing a concentration difference between a background image and an object image of the moving-object M in a two-dimensional image G. In this method, processing points are arranged on the two-dimensional image G at equal distances from one another, fundamental wave Fourier transformation is carried out with respect to each pixel value on a circumference of a circle formed around each of the processing points, and a phase obtained by the fundamental wave Fourier transformation, i.e., a normal vector with respect to a contour of the object image in the processing point is extracted to identify the moving-object M.

More specifically, an arbitrary one point on an image on which the background image is displayed is regarded as an arrangement point, this arrangement point is defined as a reference, a standard object image imitated from an outer shape of a human of a subject to be monitored is arranged on the two-dimensional image G, a normal vector group in a contour portion of the standard object image is obtained from the concentration difference between the standard object image and the background image, position information from the arrangement point to each normal vector of the normal vector group, and angle information at each normal vector are obtained, and these position information and angle information are stored as standard data in the arrangement point. Next, the normal vector group in the contour portion of the object image is obtained from the concentration difference between the object image and the background image with respect to the two-dimensional image G on which the object image of the moving-object M to be monitored is obtained, and a correct point group corresponding to the arrangement point is obtained based on the standard data from the normal vector group. If many focus regions (vector focus) formed by the correct point group are formed in a constant region of the arrangement point, it is identified that this object image corresponds to the standard object image, i.e., the moving-object M to be monitored.

The moving-object M identified in this manner is represented by a representative point P having a constant height (standard height) in the space, a tracking line L is output from the representative point P, and this is tracked and monitored. In this embodiment, since a human is the subject to be monitored, the height of the human is defined as about 1600 mm, the real space coordinate system shows a point corresponding to the height of 1200 mm as the representative point P in the two-dimensional image G such that the standard height shows a height position of 1200 mm with respect to the human.

Next, of the plurality of representative points P to be tracked and monitored in the two-dimensional image G, if two representative points P exist relatively close to each other, this two-dimensional image G is subjected to the following processing by the height calculation unit 24.

Here, the subject to be monitored is usually determined as a "human", the height of the moving-object M to be monitored can naturally be specified (e.g., the height of human can be set to about 1600 mm). On the other hand, when two representative points P run side by side, even if one of them is a human to be monitored, height is varied depending upon kinds such as whether the other representative point is a human (1600 mm in height), or a shadow of the one human (0 mm in height), a bag carried by the one human (about 600 mm in height), a hand truck moved by the one human (about 600 mm in height). Therefore, it is not possible to specify the height from the two-dimensional image G only by at a glance.

Thereupon, like the representative points P1 and P2 in FIG. 2, when the points are moving while drawing tracking lines L1 and L2 side by side in the same direction, one representative point P1 of the two representative points P1 and P2 is regarded as a standard point A having standard height representing a human to be monitored, and the other representative point P2 is regarded as an assumption point B having a virtual height. Herein, the standard height of the standard point A regarded as a human is set to 1200 mm, the virtual height of the assumption point B which can not be determined as being human is set to one of 0 mm, 600 mm, 1200 mm and 1800 mm. The reason why 0 mm is included as the virtual height is that a shadow of a human is taken into consideration. Herein, the virtual height is set to 600 mm.

Next, as show in FIG. 3, a comparative point a006 obtained by correcting the standard point A corresponding to 1200 mm to the virtual height corresponding to 600 mm is obtained along a virtual vertical axis T with respect to a moving-object M1 of the standard point A. With this, if the height set value (currently 600 mm) corresponds to the height of the representative point 2 of the moving-object M2 (E) representing the assumption point B, the comparative point a006 obtained by correcting the standard point A becomes substantially the same height as the assumption point B.

Figure 4:
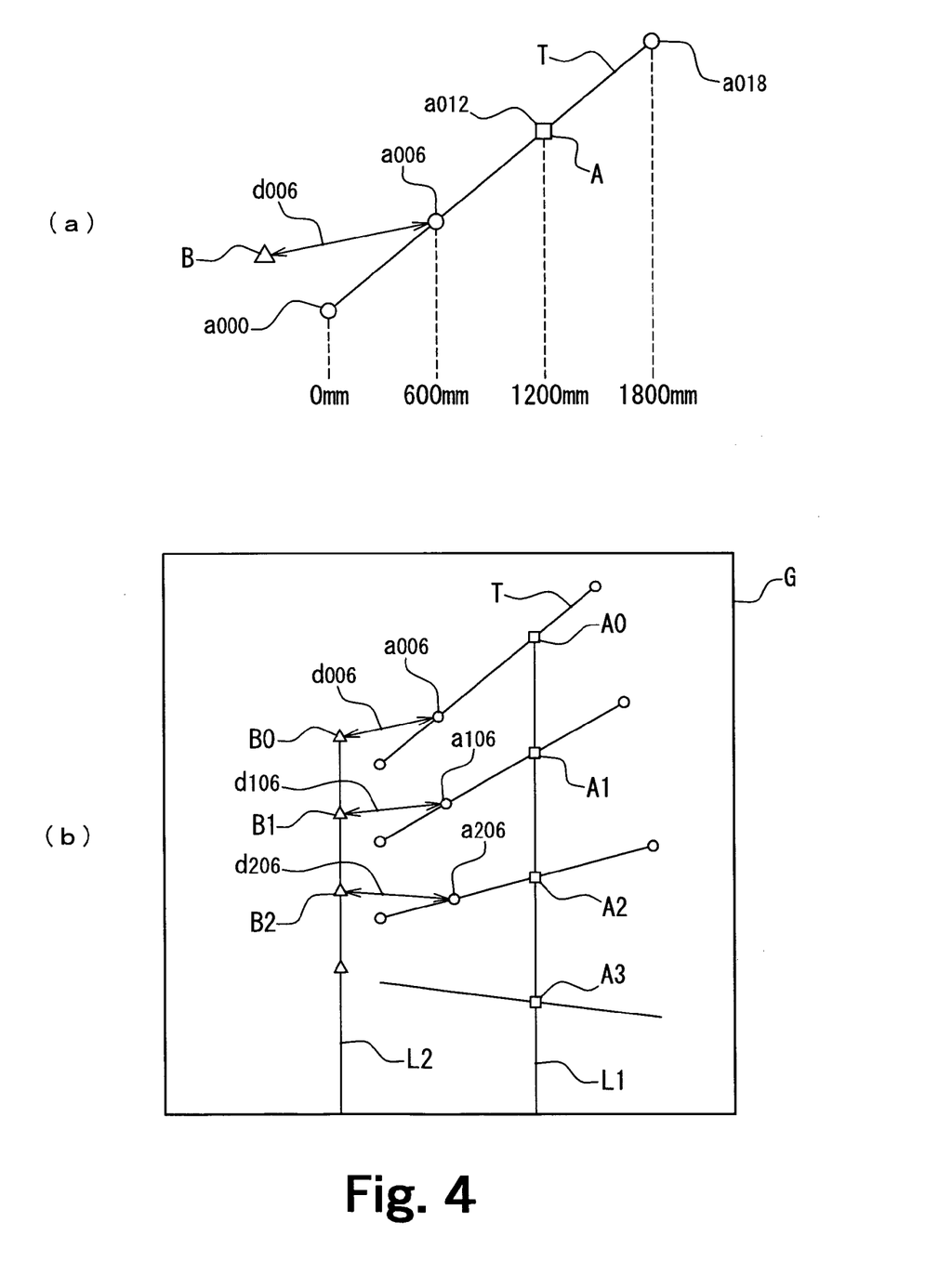
FIGS. 4A and 4B are schematic diagrams for two dimensionally explaining the processing by the height calculation unit 24 in the first embodiment.

Next, as shown in FIGS. 4A and 4B, a real space distance d006 between two points, i.e., the comparative point a006 and the assumption point B is obtained (FIG. 4A). Of the two-dimensional images G input by the camera 1 at constant clock intervals, a fluctuation q of real space distances d006, d106, d206, . . . between the two points in the two-dimensional image G during about 8 clocks in the past direction (FIG. 4B). The fluctuation q between the distance d between the two points at that time becomes a value when the virtual height set value is set to 600 mm. A real space moving distance during the clock period of the standard point A is obtained.

At least three or more height set values (e.g., 0 mm, 600 mm, 1200 mm, 1800 mm and the like) of the assumption point B shown in FIG. 3 are set, and the fluctuation q of the distance d between the two points is obtained for every different height set value.

A relation between the standard point A and the assumption point B at the two representative points P1 and P2 is reversed, and the processing operation of the height calculation unit 24 is carried out. This is because that the relation between the standard point A and the assumption point B at the arbitrarily set two representative points P1 and P2 may be opposite in some actual cases. With this, even if the relation between the initially set standard point A and assumption point B is opposite, it is possible to reliably determine the relative height of the moving-object M, and the precision of identification of the moving-object M can be enhanced.

Of the height disposition values, when the fluctuation q is the smallest and a ratio of the standard point A to the moving amount falls within a constant value, the assumption height by the height set value is obtained as a relative height of the moving-object M2 in the assumption point B with respect to the moving-object M1 in the standard point A. That is, it can be determined that the height set value of the virtual height with respect to the comparative point a corresponds to the height of the assumption point B in the moving-object M2 (E). This is because that if it is possible to assume that the comparative point a and the assumption point B have substantially the same heights, a relative position (distance) between two points is not varied.

The aforementioned process can be realized by the following computation processing, for example.

If the average conversion coefficient at the height of the height set value is k(mm/pixel), the distance d between the two points, i.e., the comparative point a and the assumption point B is obtained by the following equation.

$$d = (a-b) \times k \quad [\text{mm}]$$

Here, a and B represent plane coordinates of the two-dimensional image G on an image pixel basis, and (a-B) represents the number of pixels between the points a and B. Further, k represents a conversion coefficient per one pixel, and this value is varied depending upon a position in an image and the height (the height set value) at the real space coordinate system. Since k is also varied in the x axis direction and y axis direction of the two-dimensional image G, the aforementioned calculation and the following calculations must be carried out for each component in the x axis direction and y axis direction.

Next, if the number n of the representative points P (number of clocks) in the tracking line L in the past direction is defined as "count", the average value ave of the distance d between the two points can be obtained by the following equation.

$$ave = \frac{1}{count} \sum_n dn$$

A fluctuation j of a distance between two points for each "count" can be obtained by the following equation.

$$j = ave - d$$

A dispersion value q of distance fluctuation can be obtained by the following equation.

$$q = \sqrt{\frac{1}{count} \sum jn^2}$$

The dispersion value q of this distance fluctuation becomes the fluctuation q of the distance d between the two points.

The dispersion value q of the distance fluctuation is carried out with respect to all of the four comparative points a shown in FIGS. 3, 4A and 4B, and q00 (0 mm), q06 (600 mm), q12 (1200 mm), q18 (1800 mm) are obtained as dispersion values q in the virtual heights (0 mm, 600 mm, 1200 mm, 1800 mm).

Of the dispersion values q00 to 18, the height set value of the virtual height with respect to the comparative point a in which the fluctuation q is the smallest and a ratio of the standard point A to the moving amount falls within a constant value can be regarded as corresponding to approximate height of the assumption point B in the moving-object M2 (E).

On the other hand, in order to obtain the virtual height of the assumption point B in detail, the following computation should be carried out.

Of the q00 (0 mm), q06 (600 mm), q12 (1200 mm) and q18 (1800 mm), q of the minimum value (min) is defined as q0, and q of min−1 and min+1 prior to/subsequent to q0 are defined as qm and qp (if q06 corresponds to 600 mm height is q0, q00 and q12 prior to/subsequent to q06 are qm and qp).

The height h of the assumption point B to be obtained can be obtained by the following equation.

$$h_{min} = \frac{q_m - q_p}{2 \times (q_p + q_m)} \times H_{pich} + H_{base}$$

Figure 5:
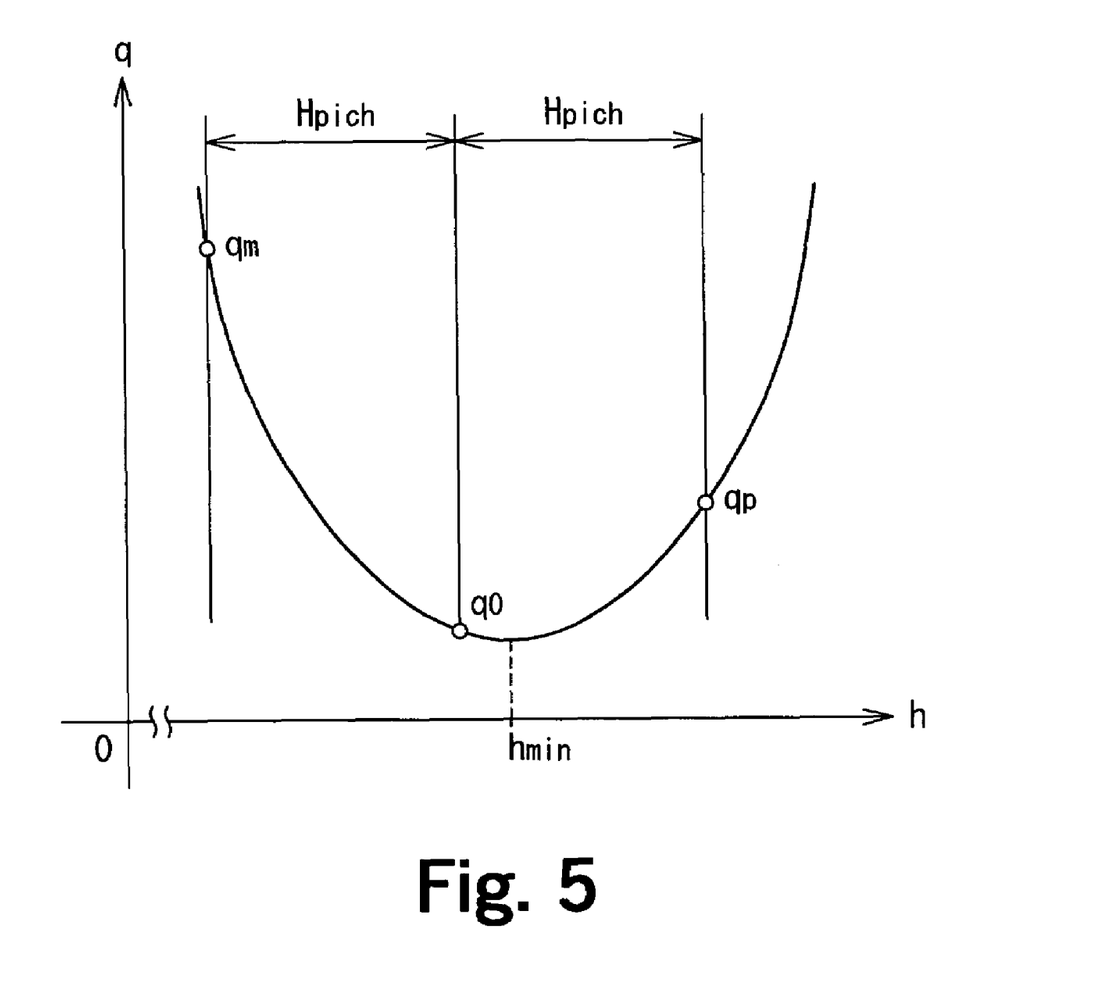
FIG. 5 is a graph showing a quadratic curve for obtaining the height of an assumption point.

That is, as shown in FIG. 5, three points q are defined as points on the quadratic curve, and its extremely small value hmin becomes the height of the assumption point B. In the case of the aforementioned example, since the comparative point a is on a 600 mm basis, Hpich is equal to 600 mm. Further, since the standard height is 1200 mm, Hbase can be equal to 1200 mm.

If a human that is the moving-object M1 representing the standard point A is 1600 mm in height, A height h1 of the moving-object M2 (E) itself which represents the assumption point B can be obtained by the following equation.

$$h_1 = h_{min} \times \frac{1600}{1200}$$

According to the first embodiment as explained above, when two moving-objects M move side by side in the same direction relatively close to each other in the two-dimensional image G captured by the single camera 1 (image-capturing means) from above, relative heights of the two moving-objects M can be calculated by the height calculation unit 24.

Since the specific moving-object M (e.g., human) to be monitored is determined, the height of the moving-object M that is the original subject to be monitored is also determined. Therefore, in the identification unit 25, if a moving-object M that is not the original subject to be monitored is found from moving-objects M which were once tracked as subjects to be monitored by the recognition unit 22, on the basis of the relative height of the moving-object M obtained by the height calculation unit 24, it is possible to realize a moving-object identifying apparatus having excellent monitoring precision.

Second Embodiment

In the first embodiment, as processing structure of the height calculation unit 24, the comparative point a is obtained by correcting the standard point A to a value corresponding to the virtual height along the virtual vertical axis T with respect to the moving-object M in the standard point A, and the fluctuation amount q of the distance d between the two points, i.e., the comparative point a and the assumption point B is obtained.

Figure 6:
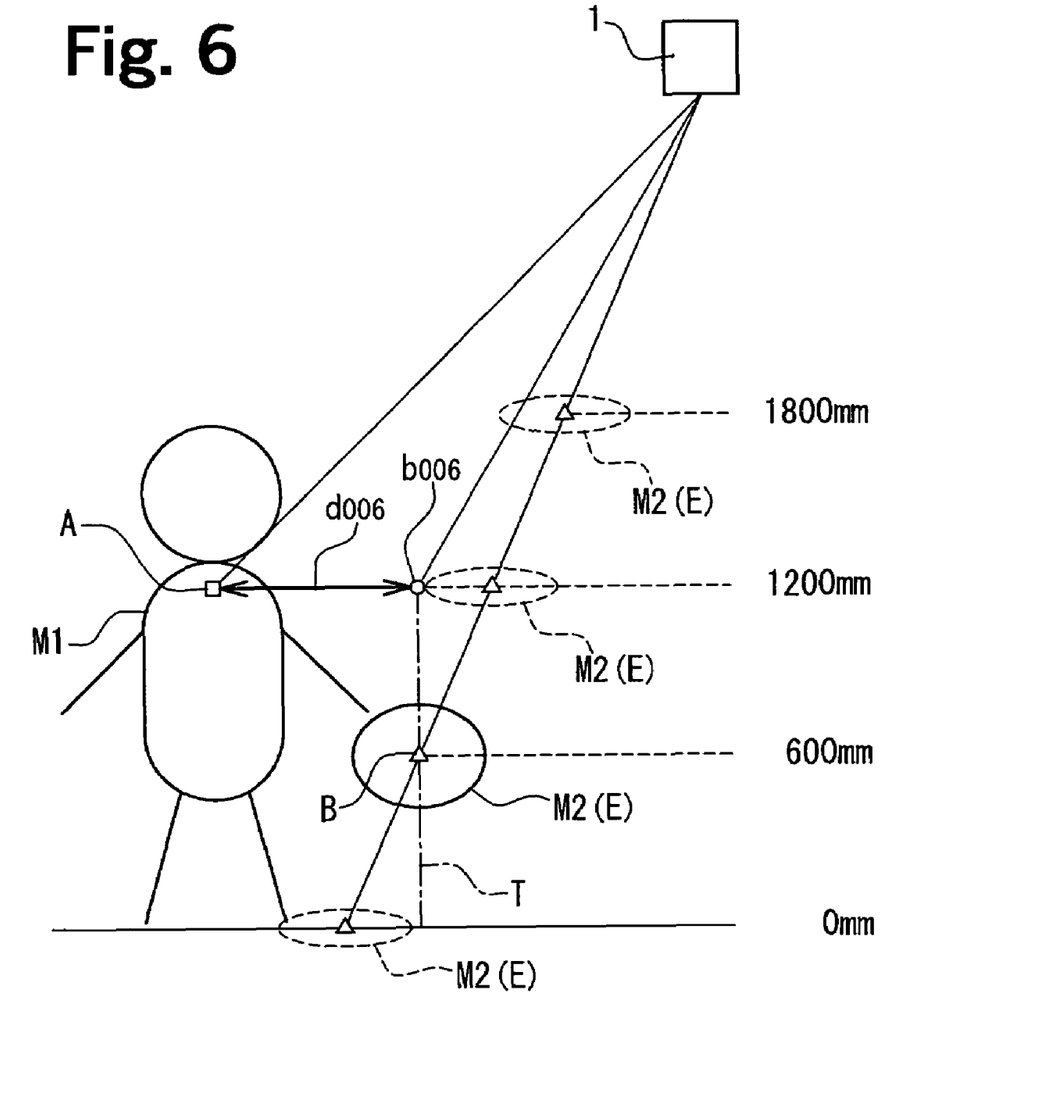
FIG. 6 is a schematic diagram for three dimensionally explaining the processing by a height calculation unit 24 in a second embodiment.
Figure 7:
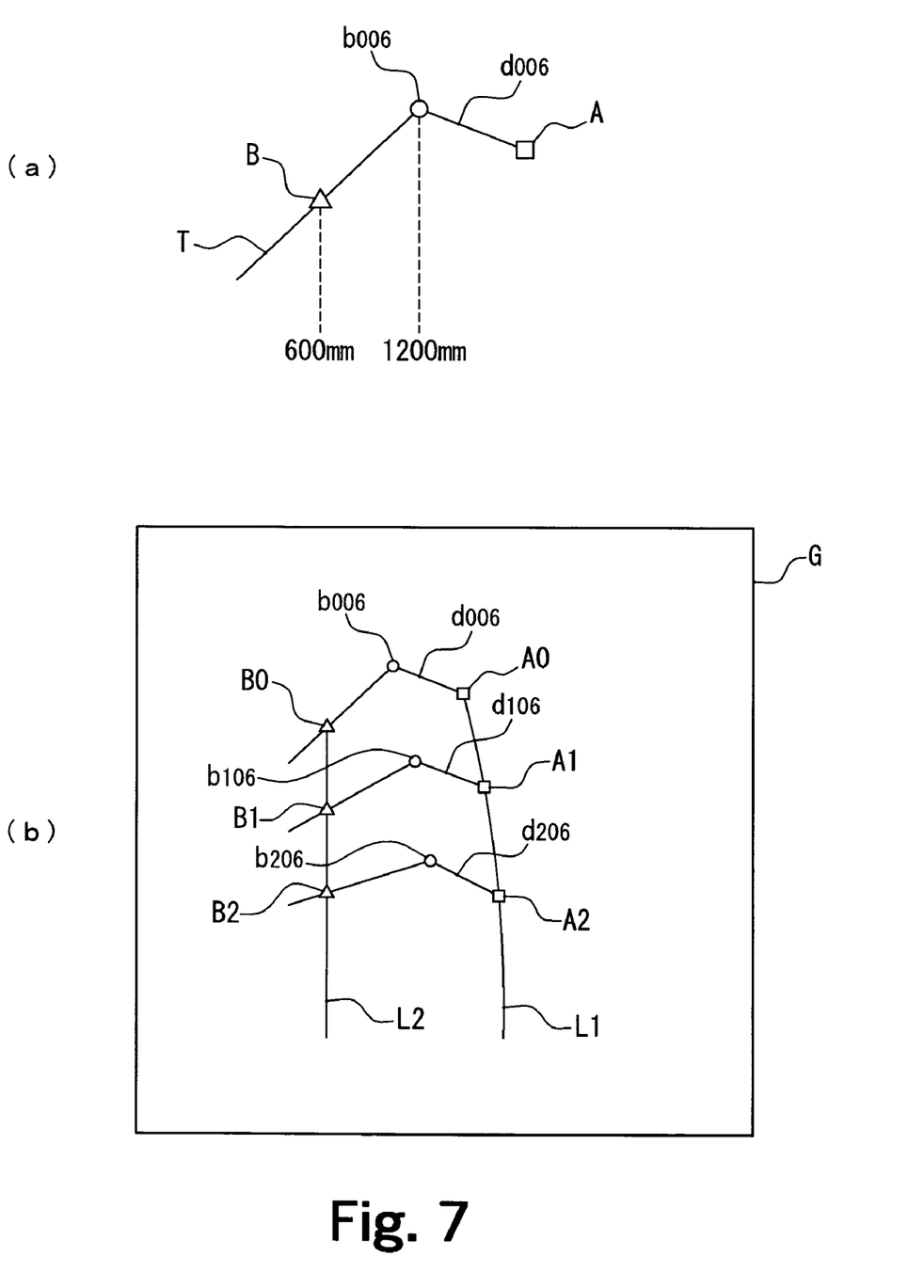
FIGS. 7A and 7B are schematic diagrams for two dimensionally explaining the processing by the height calculation unit 24 in the second embodiment.

According to a second embodiment, as the processing structure of the height calculation unit 24, as shown in FIG. 6, a comparative point a obtained by moving the assumption point B to a value corresponding to the standard height along the virtual vertical axis T with respect to the moving-object M in the assumption point B is obtained. Then, as shown in FIG. 7(a), a distance between two points, i.e., the comparative point a and the standard point A is obtained, and as shown in FIG. 7(b), a fluctuation amount q of a distance d between the two points in the two-dimensional image G during a continuous period of at least three or more clocks is obtained. Other structures are the same as those in the first embodiment.

Therefore, this embodiment has the same effect as that of the first embodiment, and it is possible to realize a moving-object identifying apparatus having excellent monitoring precision.

The present invention is not limited to the above embodiments, and the subject to be monitored is not limited to human, and a moving-object such as a vehicle may be the subject to be monitored.

The invention claimed is:

1. A moving-object height determining apparatus comprising:

single image-capturing means for capturing an image of a monitoring region from above;

recognition means for recognizing, as a moving-objet, a region having a concentration difference of an image in a two-dimensional image obtained from the image-capturing means to calculate a representative point;

tracking means for tracking the representative point; and height calculation means having a conversion coefficient which converts, into a real space distance, a distance in an image determined by assuming a point in the image as a height from the ground, wherein, when two representative points to be calculated by the recognition means are adjacent to each other in the image:

the height calculation means obtains two loci in the image obtained by tracking the two representative points independently during a period of a plurality of clocks by the tracking means, the height calculation means regards one representative point as a standard point having a standard height from the ground and regards the other representative point as an assumption point having a height set value of a virtual height from a ground and determines a comparative point corresponding to the virtual height on a vertical axis passing through the standard point on the real space, the height calculation means obtains a distance between two points of the comparative point and the assumption point on the real space using the conversion coefficient and obtains a distance between the two points of the comparative point and the assumption point on the real space after tracking the two representative points during the period of the plurality of clocks to obtain a fluctuation amount of the distance between the two points of the comparative point and the assumption point and a real space moving distance of the standard point during the period of the plurality of clocks, the height calculation means assumes at least three different height set values of a virtual height from the ground with respect to the assumption point, and obtains the fluctuation amount of the distance between the two points of the comparative point and the assumption point for every different height set value, the height calculation means obtains a fluctuation amount of the distance between the two points of the comparative point and the assumption point and a real space moving distance of the standard point during the period of the plurality of clocks in a state where a relation of the standard point and the assumption point is reversed from each other with respect to each of the height set values, and when the height calculation means determines the smallest fluctuation amount of the fluctuation amounts in the different height set values and determines that a ratio of the smallest fluctuation amount with respect to the real space moving distance of the standard point falls within a constant value, the height calculation means obtains the virtual height of the height set value indicating the smallest fluctuation amount as a height of the moving-abject in the assumption point with respect to a height of the moving-object in the standard point; or the height calculation means regards that the fluctuation amounts in the different height set values vary in a form of two-dimensional equation, and obtains a correction value of the virtual height indicating a minimum value in the two-dimensional equation as a height of the moving-object in the assumption point with respect to a height of the moving-object in the standard point.

2. The moving-object height determining apparatus according to claim 1, wherein in a state where a relation of the standard point and the assumption point is reversed from each other, the height calculation means obtains a second fluctuation amount of a distance between two points of the comparative point and the assumption point and a second real space moving distance of the standard point during the period of the plurality of clocks, and determines the smallest second fluctuation amount of the second fluctuation amounts in the different height set values and determines that a ratio of the smallest second fluctuation amount with respect to the second real space moving distance of the standard point falls within a constant value.

3. A moving-object height determining apparatus comprising:

single image-capturing means for capturing an image of a monitoring region from above;

recognition means for recognizing, as a moving-object, a region having a concentration difference of the image in a two-dimensional image obtained from the image-capturing means to calculate a representative point;

tracking means for tracking the representative point; and height calculation means having a conversion coefficient, which converts, into a real space distance, a distance in the image determined by assuming a point in the image as a height from the ground, wherein when two representative points to be calculated by the recognition means are adjacent to each other in the image:

the height calculation means obtains two loci in the image obtained by tracking the two representative points independently during a period of a plurality of clocks by the tracking means, the height calculation means regards one representative point as a standard point having a standard height from the ground and regards the other representative point as an assumption point having a height set value of a virtual height from the ground, and determines a comparative point corresponding to the standard height on a vertical axis passing through the assumption point on the real space, the height calculation means obtains a distance between two points of the comparative point and the standard point on the real space using the conversion coefficient and obtains a distance between the two points of the comparative point and the standard point on the real space after tracking the two representative points during the period of the plurality of clocks to obtain a fluctuation amount of the distance between the two points of the comparative point and the standard point and a real space moving distance of the standard point during the period of the plurality of clocks, the height calculation means assumes at least three different height set values of a virtual height from the ground with respect to the assumption point, and obtains the fluctuation amount of the distance between the two points of the comparative point and the standard point for every different height set value, the height calculation means obtains a fluctuation amount of the distance between the two points of the comparative point and the standard point and a real space moving distance of the standard point during the period of the plurality of clocks in a state where a relation of the standard point and the assumption point is reversed from each other with respect to each of the height set values, and when the height calculation means determines the smallest fluctuation amount of these fluctuation amounts in the different height set values and determines that a ratio of the smallest fluctuation amount with respect to the real space moving distance of the standard point falls within a constant value, the height calculation means obtains the virtual height of the height set value indicating the smallest fluctuation amount as a height of the moving-objet in the assumption point with respect to a height of the moving-object in the standard point, or the height calculation means regards that the fluctuation amount in the different height set values vary in a form of a two-dimensional equation, and obtains a correction value of the virtual height indicating a minimum value in the two-dimensional equation as a height of the moving-object in the assumption point with respect to a height of the moving-object in the standard point.

* * * * *